US005802927A

United States Patent [19]

Yu et al.

[11] Patent Number: 5,802,927

[45] Date of Patent: Sep. 8, 1998

[54] ROTARY DRIVING MECHANISM FOR BRAKE DEVICE

[76] Inventors: Yung-Jung Yu, No. 20, Lane 221, Sec. 4, Chung-Ho Street, Hsin-She Hsiang; Chiu-Hsia Chien Wang, No. 27, Lane 15, Sec. 3, Chung-Hsiao Road, San-Chung City; Ming-Huang Chen, No. 143, Chung-Yang Road, Feng-Yuan City, all of Taiwan

[21] Appl. No.: 815,609

[22] Filed: Mar. 12, 1997

[51] Int. Cl.[6] .......... F16C 1/10

[52] U.S. Cl. .......... 74/502.2; 74/489

[58] Field of Search .......... 74/502.2, 502.6, 74/489

[56] References Cited

U.S. PATENT DOCUMENTS

| | | | |
|---|---|---|---|
| 4,461,189 | 7/1984 | Rottenkolber et al. | 74/506 X |
| 5,476,019 | 12/1995 | Cheever et al. | 74/506 |
| 5,660,083 | 8/1997 | Huang et al. | 74/502.2 |
| 5,676,020 | 10/1997 | Jordan et al. | 74/475 |
| 5,682,963 | 11/1997 | Tang | 188/24.22 |
| 5,685,198 | 11/1997 | Hawkins | 74/502.2 |

*Primary Examiner*—Charles A. Marmor
*Assistant Examiner*—David M. Fenstermacher
*Attorney, Agent, or Firm*—Rosenberg, Klein & Bilker

[57] ABSTRACT

A rotary driving mechanism for brake device which mainly includes: a brake device, a base seat, and a rotary member, a linking member, a guiding block, and a torque spring. Therefore, the invention provides a rotary driving mechanism which is fitted to a handle of the bicycle for driving a brake device. A pulling travel of the steel cord for driving the brake device is elongated and the abrasion of the section against which the steel cord is pulled is avoided. Also, a torque spring is used to achieve a better restoring effect.

12 Claims, 7 Drawing Sheets

ROTARY DRIVING MECHANISM FOR BRAKE DEVICE

BACKGROUND OF THE INVENTION

The present invention relates to a rotary driving mechanism fitted around a handle of the bicycle for driving a brake device. A rotary member of the driving mechanism is rotated about the axis of the handle to pull a steel cord for driving the brake device to create braking effect.

FIG. 1 shows a rotary driving mechanism of a conventional bicycle-used brake device. A steel cord is inserted and located in an insertion hole of a stopper board. The steel cord extends out from upper side of a locating arch block and wound along the locating arch block. The steel cord is also passed through the pulley between two locating seats to press and locate the pulley on the locating seats. The steel cord is further wound through the pulley at the bottom of a base seat to connect with and control the brake device of the bicycle as shown in FIG. 3.

Some shortcomings exist in such arrangement as follows:

1. The stopper plate of the rotary member is latched with a spring which serves to restore the rotary member to its home position. However, when extended, the spring in the base seat is stretched in an arch state so that the axis of the spring is curved to abut against inner side of the base seat. Therefore, although the spring has better restoring force, it is apt to be permanently deformed and lose its function.

2. The stopper plate is such set that the rotary member has a rotational angle of about 90 degrees. Therefore, after the brake device is abraded to a certain extent, the rotational angle of the driving section will be inevitably increased. This leads to limitation of the pulling length of the steel cord.

3. In the case that a transmission steel cord driving system as shown in FIG. 2 is also installed, it will be impossible to simultaneously install the rotary driving mechanism. Therefore, the useful range is limited.

SUMMARY OF THE INVENTION

In order to obviate the above problems, it is a primary object of the present intention to provide a rotary driving mechanism fitted with a handle of the bicycle for driving a brake device. The pulling travel of the steel cord for driving the brake device is elongated and the abrasion of the section against which the steel cord is pulled is avoided. Also, a torque spring is used to achieve a better restoring effect.

It is a further object of the present invention to provide the above rotary driving mechanism which can be installed inside or outside the handle of the bicycle to enhance the appearance of the handle.

The present invention can be best understood through the following description and accompanying drawings, wherein:

DETAILED DESCRIPTION OF THE PREFERRED EMBODIMENTS

Figure 4:
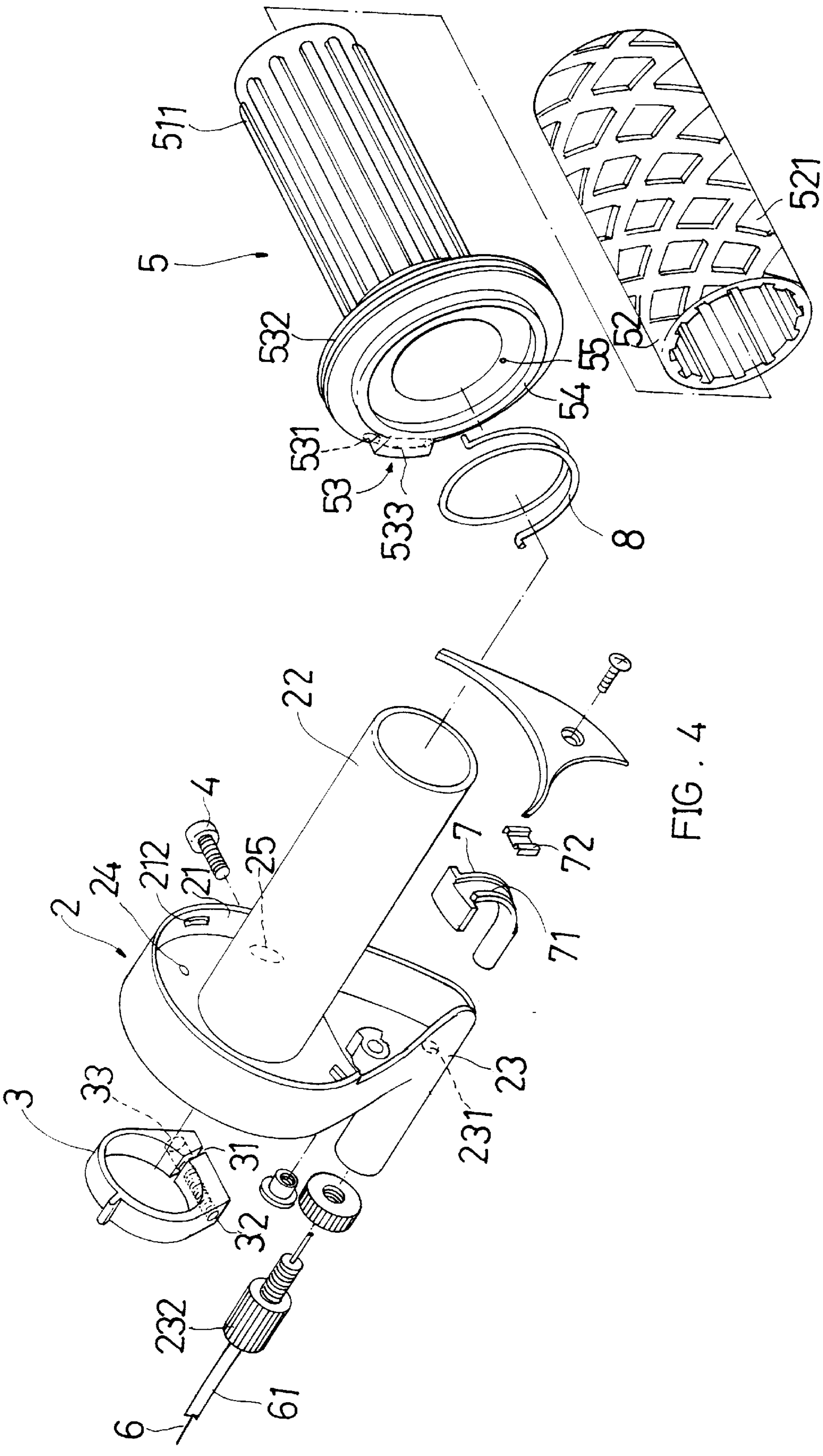
FIG. 4 is a perspective exploded view of the rotary driving mechanism of the present invention.
Figure 5:
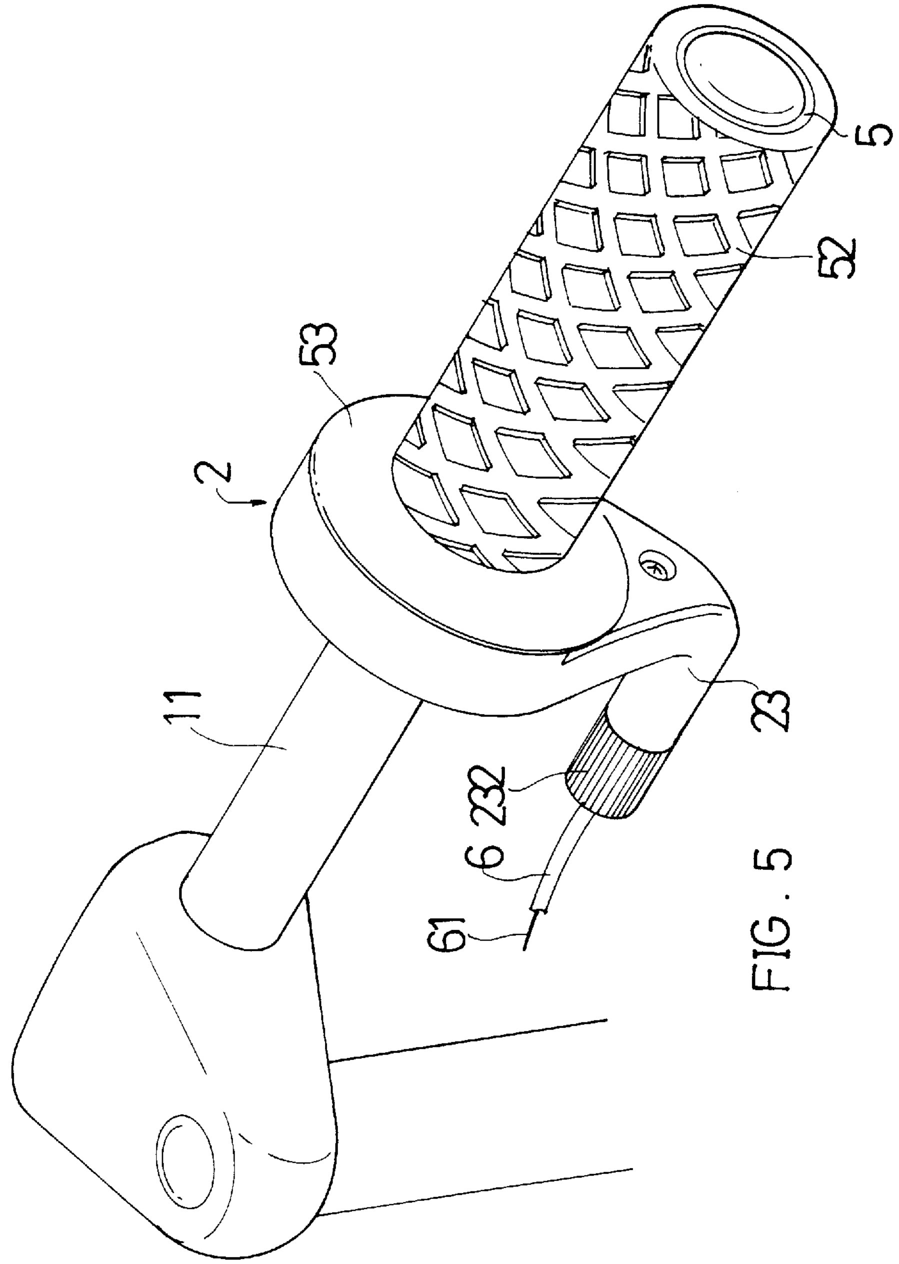
FIG. 5 is a perspective view showing that the rotary driving mechanism of the present invention is installed in the handle of the bicycle.

Please refer to FIGS. 4 and 5. In a preferred embodiment of the present invention, the rotary driving device includes a base seat 2, a rotary member 5, a linking member 6, a guiding block 7 and a torque spring 8.

The base seat 2 is installed in the handle 11 of the bicycle. The inner side of the base seat 2 is formed with a flange to define an annular rotary groove 21. A shaft sleeve 22 axially projects from the center of the inner side along the handle 11. A bearing 221 is disposed around the shaft sleeve. The outer circumference of the base seat 2 is disposed with a conducting section 23 projecting outward in a reverse direction of the shaft sleeve 22. A guiding hole 231 passes through the end face of the conducting section 23 to the rotary groove 21. The free end of the conducting section 23 is disposed with inner thread with which an adjustment bolt 232 is screwed.

The outer side of the base seat 2 is further disposed with a recess (not shown) for inserting a binding member 3 therein. The binding member 3 has an opening 31. A bolt 4 is passed through two sides of the opening 31 to force one side toward the other side. One side of the opening 31 is formed with inner thread hole 32, while the other side is formed with a through hole 33. The base seat 2 is formed with a corresponding stepped hole 25, whereby the head of the bolt 4 is imbedded in the stepped hole 25. The binding member 3 serves to fix the base seat 2 in the handle 11.

The rotary member 5 is rotatably fitted around the bearing 221 of the shaft sleeve 22. The rotary member 5 is coaxial with the handle 11 on which the shaft sleeve 22 is fitted. The length of the rotary member 5 is such as to cover the width of a human palm. Many axial ribs 511 are disposed on outer face of the rotary member 5 for engaging with inner wall of a slipproof sleeve 52 fitted around the rotary member 5. The outer face of the slipproof sleeve 52 is formed with multiple concave and convex stripes 521 to achieve a better slipproof effect.

One end of the rotary member 5 is disposed with a fastening seat 53 rotatably disposed in the rotary groove 21 of the base seat. A stopper ring 54 projects from the center of the fastening seat 53. The outer circumference of the stopper ring 54 has a predetermined radius. The outer circumference of the fastening seat 53 is formed with a stepped hole 531. In addition, an annular engaging groove 532 is formed along the outer circumference of the fastening seat 53. The inner circumference of the rotary groove 21 of the base seat is formed with several engaging tenons 212 for engaging with the engaging groove 532 so as to radially locate the fastening seat 53.

Figure 6:
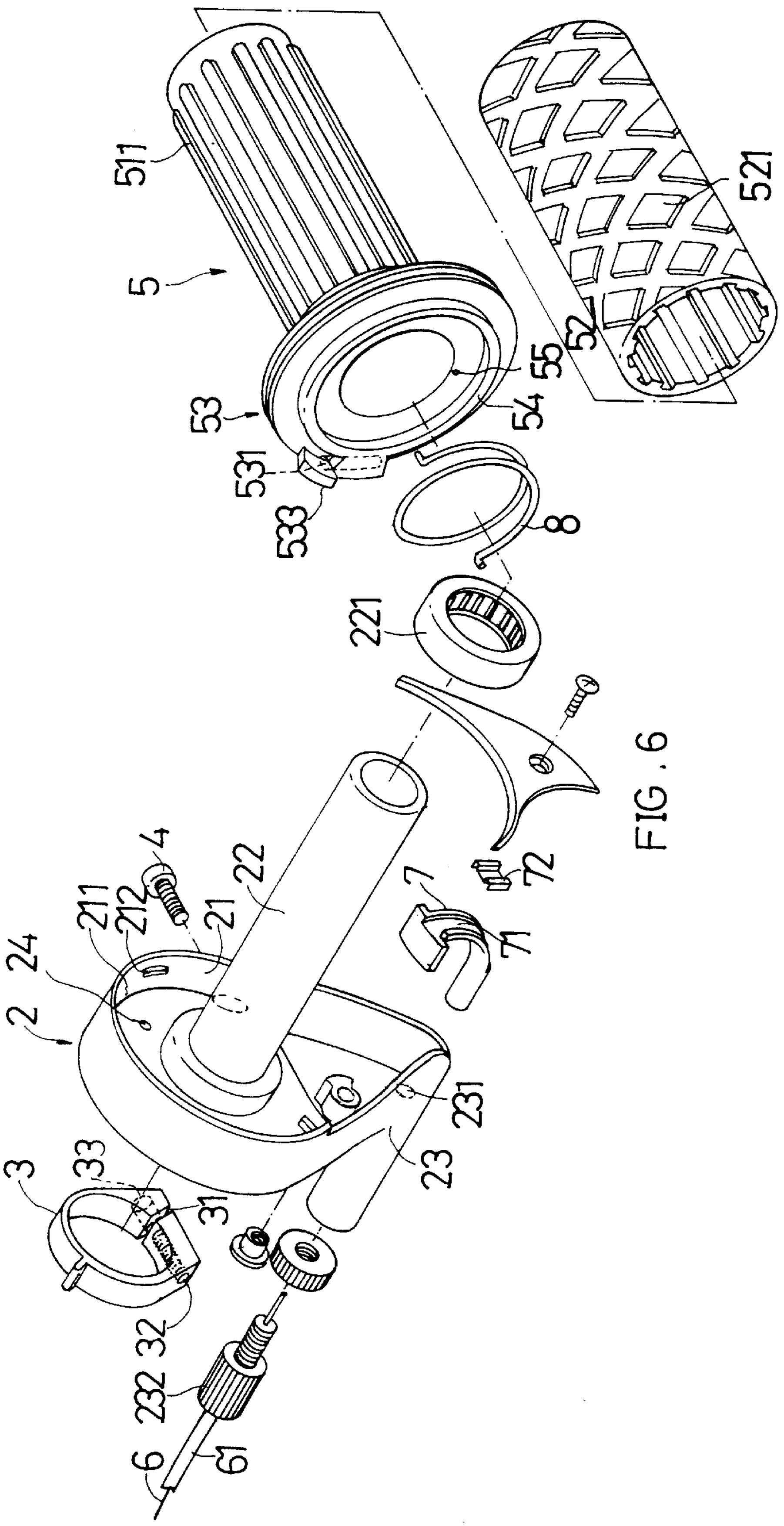
FIG. 6 is a perspective view showing that a stopper plate projects outward from the outer circumference of the stopper ring of the fastening seat of the rotary member near the stepped hole and the rotary groove of the base seat is formed with a corresponding arch channel.

Referring to FIG. 6, the fastening seat 53 further includes a stopper plate 533 projecting outward from the outer rim of the stopper ring 54 near the stepped hole 531. The rotary groove 21 of the base seat 2 is disposed with a corresponding arch channel 211 as a sliding path of the stopper plate 533. Therefore, the rotary member 5 is driven and stopped in a predetermined position. Also, the stopper plate 533 is stopped by the end of the arch channel 211 so as to set the rotational angle of the rotary member 5 within the range of at least 180 degrees.

Figure 1:
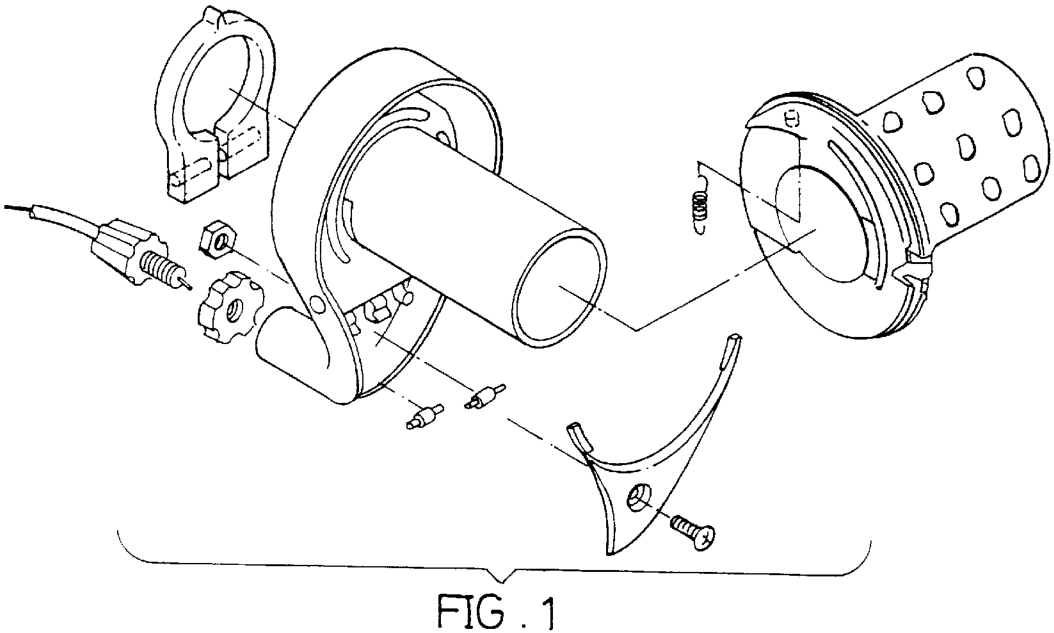
FIG. 1 is a perspective exploded view of a conventional rotary driving mechanism for bicycle-used brake device.
Figure 2:
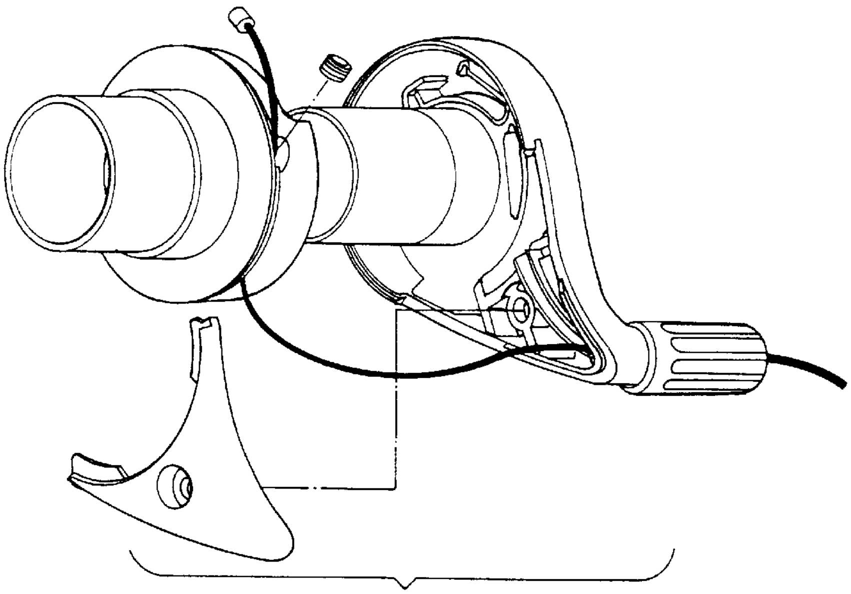
FIG. 2 is a perspective exploded view of a bicycle transmission steel cord driving system.
Figure 3:
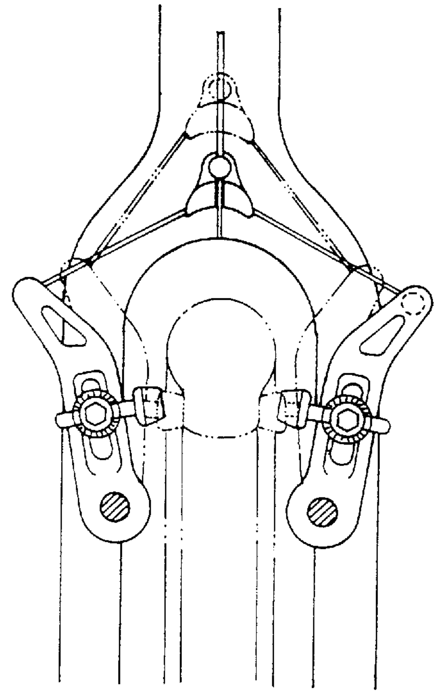
FIG. 3 shows a brake device mounted on the bicycle frame, in which a steel cord is used to control the brake device to clamp the wheel of the bicycle.

The linking member 6 is a steel cord with a predetermined length. One end of the steel cord is secured to the brake device 12 mounted on the frame of the bicycle as shown in FIG. 3, while the other end of the steel cord is passed through the adjustment bolt 232 of the conducting section of the base seat 2 and conducted along the guiding hole 231 to be secured at the stepped hole 531 of the rotary member. The linking member 6 is wound around the outer circumference of the stopper ring 54 of the rotary member. The linking member 6 is coated with a skin 61 one end of which is stopped by the end of the adjustment bolt 232.

The guiding block 7 has an arch guiding channel 71 and is disposed under the linking member 6 in the base seat 2. One end of the guiding block 7 axially extends toward the guiding hole 231 of the conducting section, while the other end thereof is directed in a tangent direction of the outer circumference of the stopper ring 54 of the rotary member. In addition, a metal sliding block 72 is disposed at a predetermined position of the arch guiding channel 71 of the guiding block 7 so as to resist against the friction produced by the compressing force of the linking member 6.

A torque spring 8 is fitted around the shaft sleeve 22. Two ends of the spring 8 are respectively secured to the adjacent faces of the rotary groove 21 of the base seat and the fastening seat 53 of the rotary member. The adjacent faces are respectively disposed with two fixing holes 23, 55 for fixing two ends of the torque spring 8 and restricting the torque spring 8 on inner side of the stopper ring 54 of the rotary member so as to locate the rotary member 5.

Figure 7:
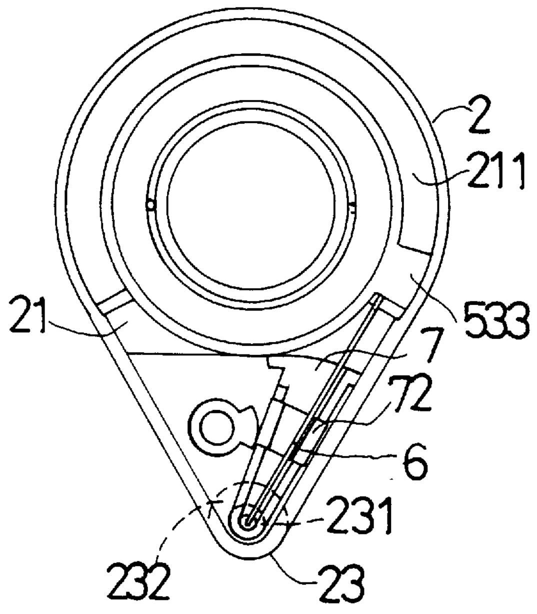
FIG. 7 shows that the rotary member is rotated to make the linking member abut against the outer circumference of the stopper ring and pulled inward.
Figure 8:
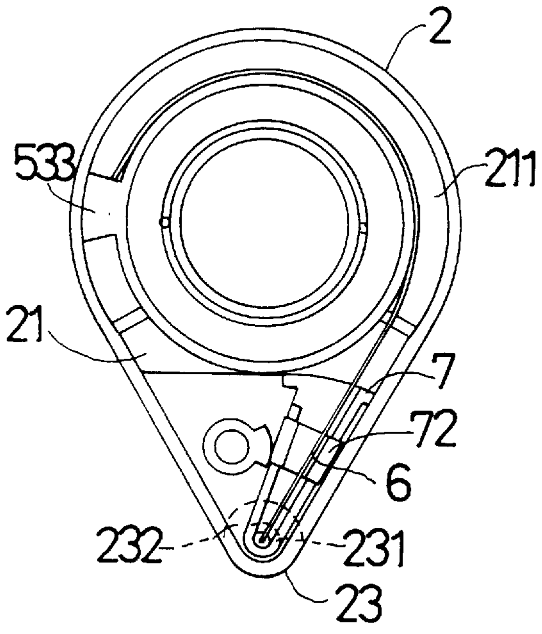
FIG. 8 shows that the rotary member is reversely rotated to release the linking member.

Referring to FIGS. 7 and 8 as well as FIG. 3, according to the above arrangement, the rotary member 5 is rotated in a predetermined direction, making the linking member 6 abut against the outer circumference of the stopper ring 54 and pulled inward, whereby the brake device 12 is forced to brake the wheel 13 of the bicycle. When the rotary member 5 is rotated in a reverse direction, the linking member 6 is released. At this time, the preset torque of the brake device 12 offsets the braking force.

In the case that the rotary member 5 is frequently rotated, at least the outer circumference of the stopper ring 54 is coated with a metal skin or is formed as a metal ring within the range of the rotational angle of the rotary member 5 so as to reduce the abrasion of the stopper ring 54 by the linking member.

Figure 9:
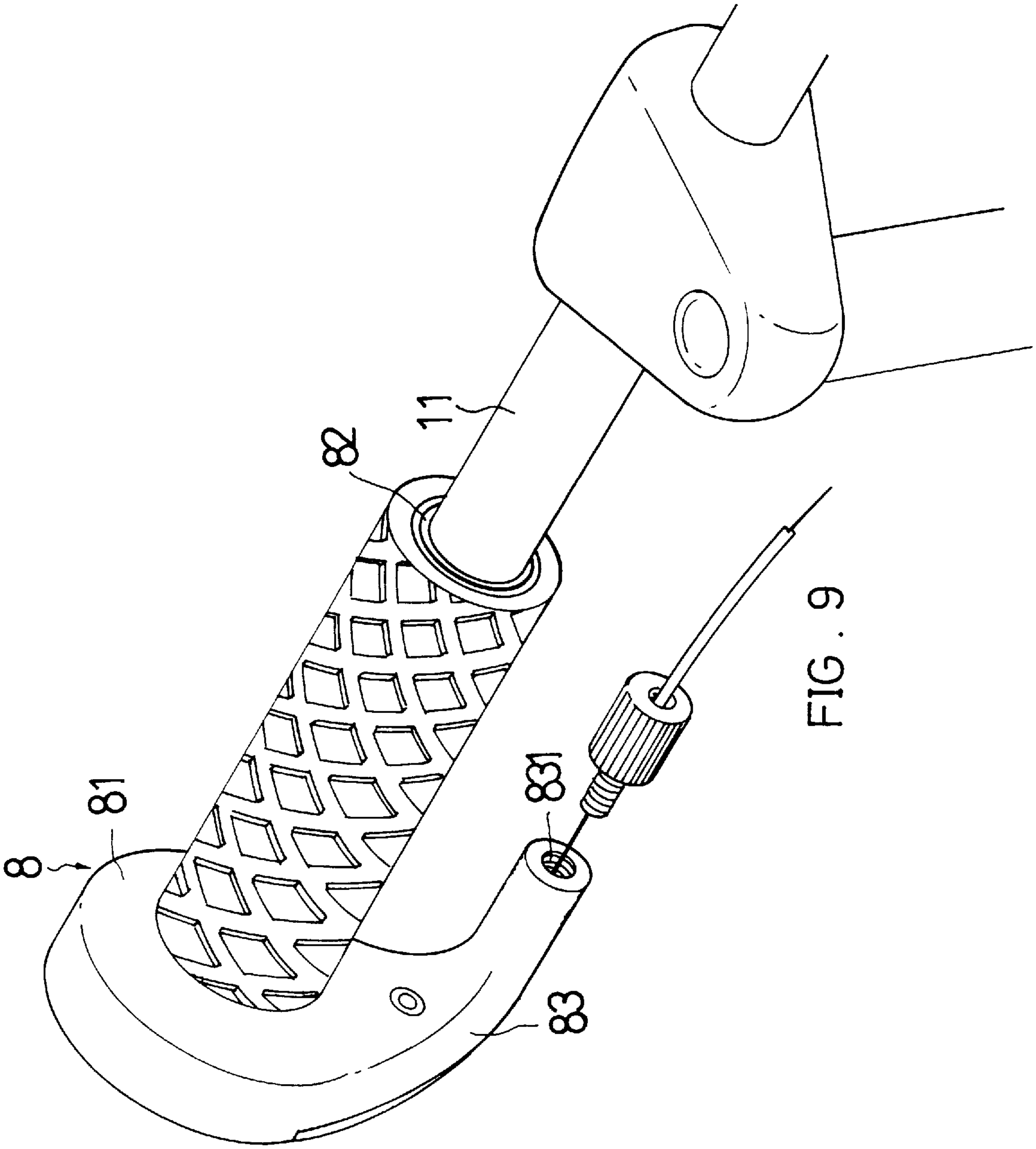
FIG. 9 is a perspective view of another embodiment of the present invention, in which the conducting section projects outward in the same direction as the shaft sleeve.

FIG. 9 shows another embodiment of the present invention, in which the base seat is installed at the end of the handle 11. Similarly, the circumference of the inner face of the base seat 8 has a flange to define an annular rotary groove 81. A shaft sleeve 82 axially projects from the center of the inner side along the handle 11. The outer circumference of the base seat 8 is disposed with a conducting section 83 projecting outward in the same direction as the shaft sleeve 82. A guiding hole 831 passes through the end face of the conducting section 83 to the rotary groove 81. According to such arrangement, by means of rotating the rotary member, the steel cord can be also pulled through a longer travel to drive the brake device.

It is to be understood that the above description and drawings are only used for illustrating some embodiments of the present invention, not intended to limit the scope thereof. Any variation and derivation from the above description and drawings should be included in the scope of the present invention.

What is claimed is:

1. A rotary driving mechanism for a brake device in combination with a bicycle, comprising:

a brake device disposed on a bicycle frame for braking a wheel of the bicycle;

a base seat installed around a handle of the bicycle, a circumference of an inner face of the base seat being formed with a flange to define an annular rotary groove, an outer face of the base seat being disposed with a recess for inserting a binding member therein so as to secure the base seat to the handle, a shaft sleeve axially extending along the handle, an outer circumference of the base seat being disposed with a conducting section projecting outward in a reverse direction of the shaft sleeve, a guiding hole passing through a face of the conducting section to the rotary groove;

a rotary member rotatably fitted around the shaft sleeve and coaxial with the handle on which the shaft sleeve is fitted, one end of the rotary member being disposed with a fastening seat rotatably disposed in the rotary groove of the base seat, an outer circumference of the fastening seat being formed with a stepped hole; and a linking member which is a steel cord with a predetermined length, one end of the steel cord being secured to the brake device, while the other end of the steel cord being passed through the conducting section of the base seat and secured at the stepped hole of the rotary member, said rotary driving mechanism being characterized in that:

the length of the rotary member is such as to cover the width of a human palm, a stopper ring projecting from the center of the fastening seat, an outer circumference of the stopper ring having a predetermined radius, at least the outer circumference of the stopper ring being coated with a metal skin, the linking member being wound around the outer circumference of the stopper ring;

a guiding block having an arch guiding channel being disposed under the linking member in the base seat, one end of the guiding block axially extending toward the guiding hole of the conducting section, while the other end thereof being directed in a tangent direction of the outer circumference of the stopper ring of the rotary member, a metal sliding block being disposed at a predetermined position of the arch guiding channel of the guiding block so as to resist against the friction produced by the compressing force of the linking member; and a torque spring is fitted around the shaft sleeve, two ends of the spring being respectively secured to two adjacent faces of the rotary groove of the base seat and the fastening seat of the rotary member, the torque spring being restricted on inner side of the stopper ring of the rotary member so as to locate the rotary member.

2. A rotary driving mechanism as claimed in claim 1, wherein the binding member has an opening, a bolt being passed through two sides of the opening to force one side toward the other side, one side of the opening being formed with an inner thread hole, while the other side being formed with a through hole, the base seat being formed with a corresponding stepped hole, whereby the head of the bolt is imbedded in the stepped hole.

3. A rotary driving mechanism as claimed in claim 1, wherein the linking member is coated with a skin one end of which is stopped by an end of the adjustment bolt.

4. A rotary driving mechanism as claimed in claim 1, wherein the fastening seat includes a stopper plate projecting outward from an outer rim of the stopper ring near the stepped hole, the rotary groove of the base seat being disposed with a corresponding arch channel as a sliding path of the stopper plate, whereby the rotary member is driven and stopped in a predetermined position with the stopper plate stopped by the end of the arch channel.

5. A rotary driving mechanism as claimed in claim 1, wherein the rotational angle of the rotary member is set within a range of at least 180 degrees.

6. A rotary driving mechanism as claimed in claim 5, wherein the metal skin of the outer circumference of the stopper ring of the rotary member at least covers the range of the rotational angle of the rotary member.

7. A rotary driving mechanism as claimed in claim 1, wherein an annular engaging groove is formed along the outer circumference of the fastening seat, an inner circumference of the rotary groove of the base seat being formed with several engaging tenons for engaging with the engaging groove so as to radially locate the fastening seat.

8. A rotary driving mechanism as claimed in claim 1, wherein the base seat is installed in an end of the handle of the bicycle, a circumference of an inner face of the base seat being formed with a flange to define an annular rotary groove, a shaft sleeve axially inward projecting from the center of the inner side along the handle, an outer circumference of the base seat being disposed with a conducting section projecting outward in the same direction as the shaft sleeve, a guiding hole passing through a face of the conducting section to the rotary groove.

9. A rotary driving mechanism as claimed in claim 1, wherein in the case that the brake device is in a not braking state, the stepped hole of the fastening seat of the rotary member is positioned near the conducting section of the base seat as a starting position of rotation of the rotary member.

10. A rotary driving mechanism as claimed in claim 1, wherein the adjacent faces of the rotary groove of the base seat and the rotary member are respectively formed with two fixing holes for securing two ends of the torque spring.

11. A rotary driving mechanism as claimed in claim 1, wherein a free end of the conducting section of the base seat is formed with an inner thread in which an adjustment bolt is threaded, the linking member being passed through the adjustment bolt.

12. A rotary driving mechanism as claimed in claim 1, wherein a bearing is fitted around the shaft sleeve and the rotary member is rotatably fitted around the bearing.

* * * * *